May 24, 1938.  R. P. BALL  2,118,773
CALCULATOR
Filed March 26, 1935    2 Sheets-Sheet 1

Inventor
Robert P. Ball

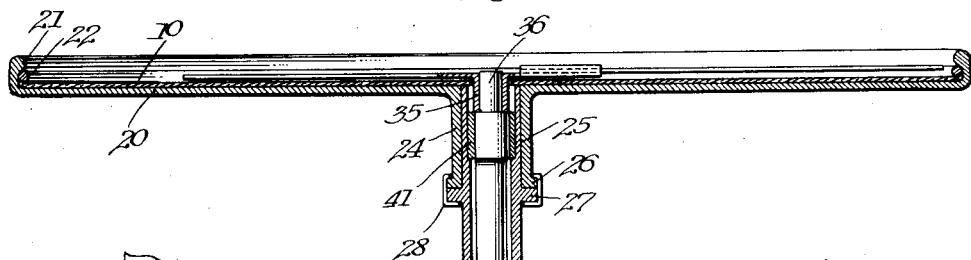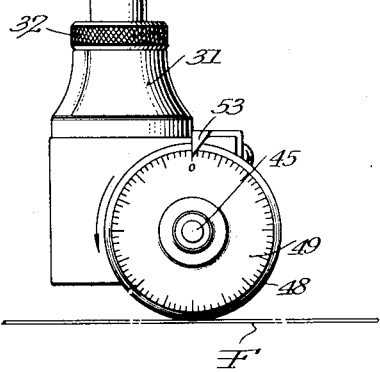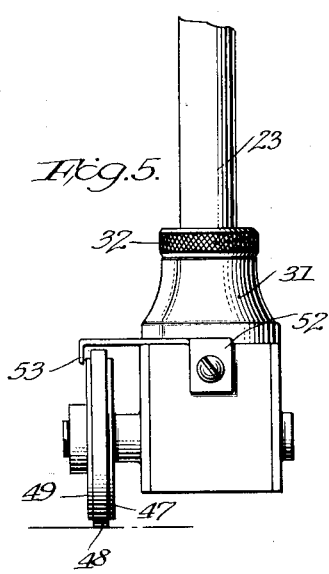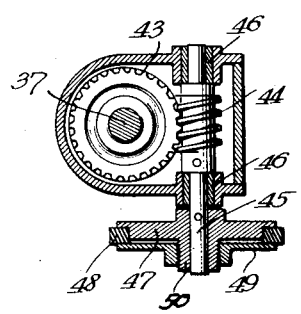

Patented May 24, 1938

2,118,773

UNITED STATES PATENT OFFICE 2,118,773

CALCULATOR

Robert P. Ball, Chattanooga, Tenn.

Application March 26, 1935, Serial No. 13,173

2 Claims. (Cl. 235—83)

The present invention relates to a calculator for use in quickly determining an unknown value from certain governing known values, which eliminates mathematical computation, the use of tables, and the like.

An object of the invention is to provide a chart and associated mechanism for use in solving an equation for an unknown value.

Another object of the invention is to provide a chart and associated mechanism for determining the true dimension of an object from an index dimension thereof.

A further object of the invention is to provide a chart and associated mechanism for enlarging or reducing to scale a dimension of an object.

The drawings illustrate a chart and associated mechanism particularly adapted for determining the true dimension of an object from the X-ray film dimension thereof. It will be apparent that constructions shown in the drawings may be diversified for solutions of various problems without departing from the range of the invention.

In the drawings, which are illustrative of one form of the invention, and in no sense restrictive:

Figure 3 is a vertical sectional view of the chart and associated mechanism;

Figure 4 is a side view of the indicating member operating mechanism;

Figure 5 is an end view of the indicating member operating mechanism; and

Figure 6 is a horizontal sectional view of the indicating member operating mechanism, taken along the line 6—6 of Figure 3.

The chart and associated mechanism shown is adapted for calculating the corrected or true dimension or dimensions of an object when a certain factor or factors which determine the dimension or dimensions of the object are known. These factors may be termed indices of the object, and by the term "index" is meant a value which is related to the object and because of its relation, determines the dimension of the object. By the term "dimension of an object", I intend to include a measurement in a single plane, a measurement of volume, or any dimension which will indicate the size of the object, or its position with respect to a known point. The dimension then, may be the length, breadth, area or volume of the object, or it may be a dimension external of the object which designates its position with respect to a known point.

Figure 1:
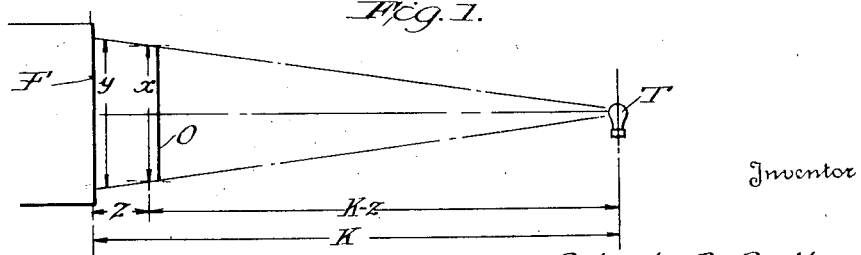
Figure 1 is a diagrammatic view of one type of problem which may be solved with the aid of this invention.

The particular application of the invention is to a problem of the type illustrated in Figure 1, in which figure the object is designated by the line O. The object is shown being subjected to the penetration of rays of light emanating from the X-ray tube T, the effect of the object upon the X-rays being recorded upon the sensitive plate or film F. This figure illustrates the general arrangement of elements used in the filming of X-ray images and, in this arrangement, it will be noted that the tube T is disposed on the opposite side of the object O from the film F. The distance from the film to the tube is designated by K, and this distance will usually not vary to any considerable extent when recording successive images of a particular object. The film object distance, which is designated by the letter $z$, may vary to some extent when successive images of a particular object are being recorded. The true dimension of the object O is indicated by the letter $x$, while the recorded dimension of object O is indicated at the film by $y$, the latter being the index dimension from which the true dimension is to be determined.

In the use of X-ray pictures of parts of the human body, it is frequently quite desirable to determine an exact dimension or dimensions of the object in the body which has been photographed. In determining the exact dimension or dimensions of the object, the tube film distance K will be known and will usually be constant for successive pictures of the same object; the object film distance $z$ may be measured at the time the X-ray impression is made, and the image dimension $y$ on the film F will be available after the impression is made. To determine the unknown dimension $x$, then, it will be necessary to solve an equation derived from proportionate triangles which formula will contain the three variables K, $z$ and $y$, each one of which can be determined. Ordinarily, as has been mentioned above, the factor K will remain constant for successive impressions. The present invention will facilitate the solution of such an equation.

Figure 2:
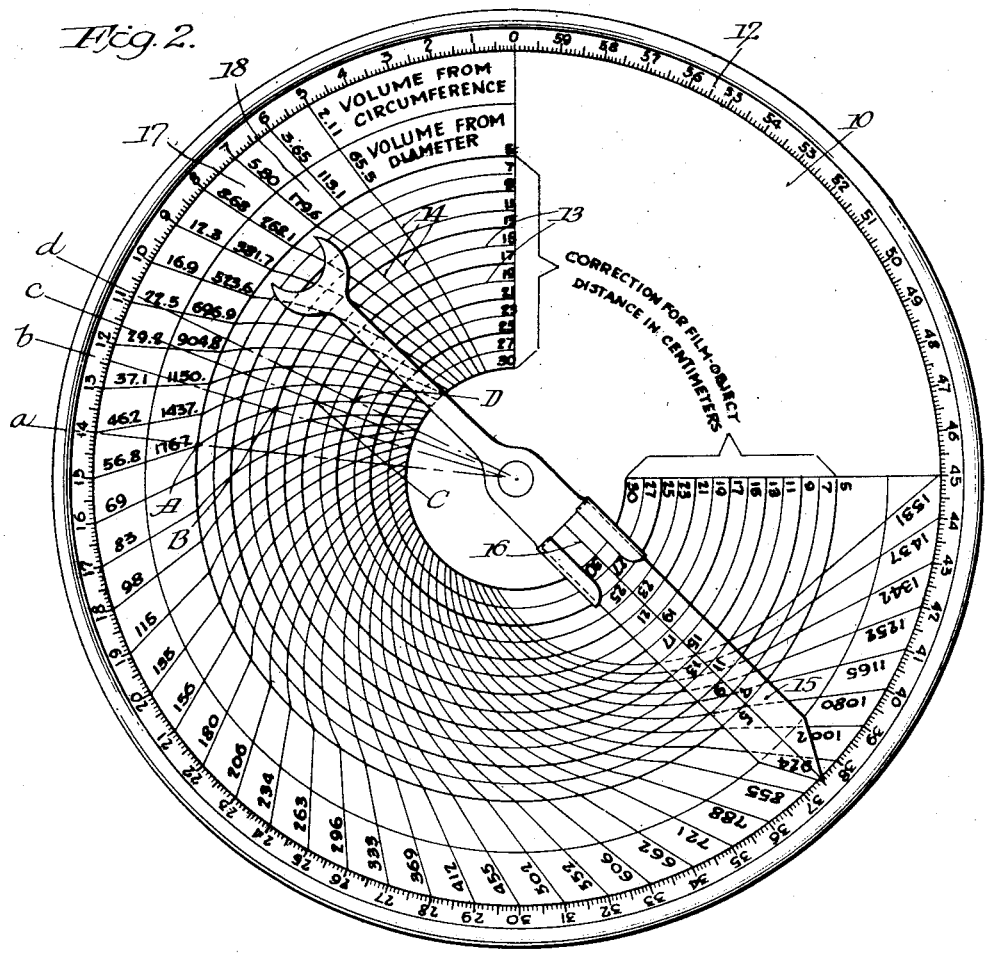
Figure 2 is a face view of one form of the chart, showing the indicating member pivoted thereon.

Referring to Figure 2, the chart 10 is shown as being circular in form and may be plotted upon celluloid or the like to facilitate reading the same. Adjacent the perimeter of the chart is a dimension scale 12, which may, in the particular problem which I have used to illustrate the invention, be suitably calibrated to serve as an indicant for the dimension or dimensions of the object, either the image dimension or the true dimension. The scale 12 is shown equally divided into sixty main divisions, ascending counterclockwise around the chart, and these main divisions may be suitably sub-divided as desired. On the chart shown in Figure 2, scale 12 is graduated in centimeters, this unit being convenient for use in measuring film images. Arbitrarily arranged upon the chart and conveniently disposed within the scale 12 are a plurality of curves in the form of concentric circles 13, said circles being provided with suitable indicia ascending as the center of the chart is approached denoting film object distance in centimeters.

Plotted with regard to the scale 12 and the concentric circles 13 are a plurality of curves 14, said curves being plotted upon the chart in a manner which will be described below. I use the term "curve" in its geometrical sense, which term may include a straight line in a special sense.

Each one of the curves 14 is plotted in the manner disclosed and described with respect to the particular curve which extends inwardly toward the center of the chart from the fifteen centimeter point on the scale 12. Having provided the chart with the scale 12 denoting the object dimensions in centimeters and with the concentric circles 13 denoting film object distances in centimeters, the curve from the image dimension point fifteen on scale 12 is plotted by a plurality of points determined by solutions of the equation mentioned above. For example, assuming that a tube film distance of thirty inches will be suitable for the successive readings to be taken, if $y$ equals fifteen centimeters and $z$ is five centimeters, the value of $x$ will be fourteen centimeters. By this solution, a point A is plotted where the five centimeter film object circle intersects a line $a$ which extends from the center of the chart to the fourteen centimeter mark on the scale 12. Similarly, knowing that, with the same thirty inch film tube distance, with a film object distance of thirteen centimeters, an image dimension of fifteen centimeters will result in a true dimension of 12.4 centimeters, the point B may be plotted at the intersection of the thirteen centimeter film object circle and radial line $b$. In the same manner, points C and D may be plotted for thirty inch film tube distance, fifteen centimeter image dimension, and film object distances of seventeen and twenty-one centimeters, respectively. After a number of these points have been plotted, they may be connected by a smooth curve as shown on the chart in Figure 2, thus resulting in one of the plotted curves 14 for all image dimensions of fifteen centimeters. The other curves 14 may be plotted in the manner described above, and as many of the same may be provided as are necessary.

In order to facilitate the use of the chart, an indicating member or pointer 15 is pivoted at the center of the chart, the working portion of said member being made of celluloid or other transparent material in order that the curves and numbers upon the chart may be observed through the pointer. The indicating member 15 is provided with a hairline 16 extending from where the same is pivoted at the center of the chart to its outer pointed end, and the indicating member may also be provided with arcs of circles of the same radius from the center of the chart as the concentric circles 13, and numbered in an identical manner with said concentric circles. The curves and numbers on the chart and indicating member may be in different colors as desired, to assist in making quick settings and readings.

The chart shown in Figure 2 is plotted for a film tube distance of thirty inches, and as many of said charts plotted for different values of the film tube distance may be plotted as are necessary for the problems encountered.

To describe the use of the chart, it is assumed that the photographic equipment was arranged for a film tube distance of thirty inches, that the film object distance at the time the X-ray impression was made was thirteen centimeters, and that the image dimension as measured upon the photographic film is fifteen centimeters. To quickly determine the true dimension of the object, the operator marks the point on scale 12 indicated at fifteen centimeters, and follows the inwardly extending curve 14 from that point until the curve intersects the thirteen centimeter film object circle at point B. The indicating member 15 is then moved until the hairline 16 passes through point B, at which time the corrected dimension (12.4 centimeters) may be read at the outer end of the indicating member on scale 12. Obviously, after using this chart a few times, the user will be able to operate the chart to obtain the true dimension with great rapidity. The result of the problem has been to proportionately reduce the base dimension of a triangle to the value of the base dimension of a smaller similar triangle. Obviously, the above operation could be reversed to proportionately enlarge the base dimension of a triangle to the value of the base dimension of a similar larger triangle.

It will be obvious that with the above described chart, the circumference of an object as well as its diameter or radius may be corrected to true value. On the chart 10, and inside of scale 12, are a pair of scales 17 and 18, marked respectively "Volume from circumference" and "Volume from diameter". These scales are marked with lines extending from the centimeter units on scale 12 to the respective curves 14, and each line is marked with numbers denoting the volume in milliliters of a sphere having respectively circumference or diameter of the value indicated at the origin of the line on scale 12. Thus, the volume of a sphere having a circumference of 9 centimeters is 12.3 milliliters, while the volume of a sphere having a diameter of 9 centimeters is 381.7 milliliters.

These two scales are particularly useful in rapidly determining the volume of the fetal head from its true diameter or circumference, and comparing the same with the volume of spheres of diameters equal to the true antero-posterior diameter of the maternal pelvis at the inlet and the interspinous diameters. By thus rapidly comparing the volume of the fetal head with volume capacities of various diameters of the pelvis, the molding and kneading necessary in the birth of the fetus is apparent.

In order to provide for convenient use of the chart, I have devised the associated mechanism disclosed in Figures 3, 4, 5 and 6. Referring to Figure 3, the chart 10 is shown held within a circular flat cup-shaped carrier 20, which carrier is provided with an inwardly extending bead or lip 21. To retain the particular chart in place after the same has been positioned in the carrier, a spring wire 22 is provided, said wire being adapted to spring under the lip 21. The carrier 20 is mounted for rotation upon the upper end of the tube 23, said carrier having an aperture at its center defined by a downwardly extending hub 24, the interior diameter of said hub being only slightly greater than the exterior diameter of the tube 23, where the hub fits over the same as at 25. The lower end of hub 24 is flanged at 26, said flange abutting against the upper surface of a shoulder 27 on the tube 23 a short distance below the upper end thereof. The carrier is retained upon the tube 23 by a retaining ring 28 which is spun around the flange 26 and the shoulder 27, the retaining ring being adapted to permit relative rotation between the hub 24 and the tube 23. While the hub 24 embraces the tube 23 relatively tightly, the arrangement is such that by grasping tube 23, the carrier 20 may be manually rotated with respect thereto, for a purpose which will later appear. The lower end of the tube 23 is provided with a flange 30, by means of which said tube is secured to a gear box 31 by means of the retaining nut 32 which screws into a threaded opening in the upper face of the gear box.

The indicating member 15 is equipped with a hub 35 at its pivot point, said hub being adapted to firmly fit over the reduced upper end 36 of an indicating member shaft 37. The engagement of the hub 35 with the reduced end 36 of the shaft is such that the indicating member will rotate with the shaft, but may be removed from the same when it is desired to change the chart 10 for one plotted for a different film tube distance. The shaft 37 extends downwardly through the tube 23 and into the gear box 31, and is mounted in suitable anti-friction bearings 39 in the floor of the gear box. A bearing bushing 40 is provided for the shaft where it enters the gear box adjacent its lower end, and a similar bearing bushing 41 is arranged within the tube 23 adjacent the upper end of the shaft, bearings 39, 40 and 41 being provided to permit easy rotation of the shaft.

Pinned to the lower end of shaft 37 and within the gear box 31 is a worm wheel 43, said worm wheel being driven by a worm 44 which in turn is keyed to the horizontal shaft 45 extending horizontally through the gear box. Shaft 45 is provided with suitable bushings 46 where it passes through the vertical walls of the gear box.

One end of shaft 45 extends a substantial distance outside the wall of the gear box, and pinned to the outer end thereof is a tracing rotor 47. The diameter of the tracing rotor is such that its periphery extends beyond one side wall of the gear box and below the lower wall of the same, as shown in Figure 4. The tracing rotor is suitably recessed throughout its perimeter to receive a tread 48, said tread being held in place by plate 49 which is threaded onto a hub 50 of the tracing rotor. The tread 48 is of rubber or other suitable friction material, in order to impart rotation to the shafts 45 and 37 and the indicating member 15 when an index dimension of an object is being traced.

One face of the gear box 31 comprises a removable wall 50', said wall being held in place by means of a screw 51 which also serves to secure a bracket 52 to the edge of the gear box. Bracket 52 has integral therewith a portion 53 which lies on the top of the gear box and extends down over the periphery of the circular plate 49 providing an auxiliary indicating member 53, as shown in Figures 4 and 5.

The outer face of the circular plate 49 may be circularly calibrated as shown in Figure 4, providing an auxiliary scale to augment the markings on scale 12. The readings of the scale on plate 49 are made with respect to the auxiliary indicating member 53.

In adjusting the apparatus for use, the tracing rotor will be revolved to the position shown in Figure 4, with pointer 53 above the zero mark on the auxiliary scale, after which the point of the indicating member 15 will be placed on zero of the chart 10 by holding the apparatus by its tube 23 and turning the carrier 20 until the zero point of chart 10 is below the point of the indicating member 15. Hub 24 of the carrier 20 fits the upper end of the tube 23 tightly enough so that the carrier will remain in this position during operation of the pointer.

The operation of the apparatus will be described in connection with the correction of the dimensions of an X-ray image. The operator, after having determined what dimension of the image is to be corrected, places the tracing rotor thereon and traces the particular dimension, moving the apparatus in the direction of the arrow (Fig. 4). Obviously, the device may be used to trace and correct a curved dimension with as much convenience as a straight line, and the rotor may be easily moved throughout the circumference of an image as well as over its diameter. Due to the frictional contact between the surface being operated upon and the rubber perimeter of the rotor, the latter will be moved at its circumference through a distance equal to the dimension of the image. The diameter of the tracing rotor and the value of the gear train of the worm 44 and worm wheel 43 are such as to cause proper speed of rotation of shaft 37 to move pointer 15 counterclockwise from zero position through a distance on scale 12 conforming with the dimension of the image. It will be apparent that by this one tracing operation, the dimension of the image is measured and the pointer 15 is set upon the chart.

The dimension of the image having now been set upon scale 12 by the indication of the member 15, the proper one of the curves 14 for the image dimension is designated. The carrier 20 is now manually rotated with respect to the tube 23 and the indicating member 15, carrying with it the chart 10, until the radial hairline 16 on the indicating member crosses the intersection of the designated curve 14 with the proper circle 13 conforming with the reading of the film object distance which was noted when the X-ray impression was made. The end of the pointer 15 will now indicate the true object dimension on the scale 12. Instead of manually rotating the carrier 20 until the hairline 16 crosses the intersection of the designated curve 14 with the proper circle 13, as discussed above, the indicating member 15 may be rotated until line 16 crosses said intersection by manually turning the tracing rotor 47, thus accomplishing the same result as above.

While in Figure 2 the chart is shown with curves 14 for only the value of each centimeter, it is obvious that additional curves could be provided for intermediate values between each centimeter. In addition, the auxiliary scale on plate 49 may be provided with any number of calibrations to make the reading of values between each centimeter as accurate as desired. At any rate, the number of curves 14 should be sufficient so that the operator may interpolate for values between each centimeter by eye.

In Figure 2, the chart shown is one which has been calibrated for a constant value of the film tube distance of thirty inches. If the object being photographed is of such dimensions that a larger film tube distance is necessary, or a smaller film tube distance is desirable, the dial face 10 may be removed and another similar dial face calibrated for a different film tube distance may be substituted. This operation may be performed quite conveniently by removing the spring wire 22 and indicating member 15, inserting the new dial face, and then returning said wire and member to their positions.

After the true dimension of the object has been determined, as described above, the corresponding sphere volume may be quickly ascertained by referring to the scales 17 or 18 on the chart 10.

It will be seen that the apparatus may provide for quick solutions of equations, reduction or enlargement of values or correction of dimensions without the necessity of mathematical calculations or resorting to computed tables and the possibility of error is thereby minimized.

The device is convenient in use, as it may be operated by a single person, and numerous calculations may be made and compared in a short period of time.

It is evident that many adaptations of the construction shown herein to meet particular needs may be made without departing from the scope of the invention.

I claim:—

1. A device for solving for the true values of dimensions of objects from dimensions of X-ray images thereof, comprising a chart including a scale, a series of curves for a variable corresponding with measured distances between an object and the X-ray film when the image is made, and a second series of curves which intersect said first-named curves for a second variable corresponding with measured dimensions of the image, said scale serving to calibrate said last-named series of curves and as an indicant for the true value of the dimension of the object as determined by the intersections of said curves, said intersections being plotted on the chart from solutions derived assuming a constant distance between the X-ray tube and the film when the image is made, and an indicating member adapted to be positioned on said chart to indicate the true values of the dimensions of the object on said scale from the intersections of said curves.

2. A device for solving for the true values of dimensions of objects from dimensions of X-ray images thereof, comprising a chart including a scale, a series of curves for a variable corresponding with measured dimensions of an image, said curves being plotted on the chart from solutions derived assuming a constant distance between the X-ray tube and the film when the image is made, said scale serving to calibrate said series of curves and as an indicant for the true value of the dimension of the object, and an indicating member adapted to be positioned on said chart, said member having graduations along its length corresponding with measured distances between an object and the X-ray film when the image is made, said member being adapted to indicate the true value of a dimension of an object on said scale when the proper graduation on said member is positioned over a selected one of said series of curves.

ROBERT P. BALL.